(No Model.)
F. P. CROSBY.
SHAFT BEARING FOR VELOCIPEDES.
No. 511,877. Patented Jan. 2, 1894.
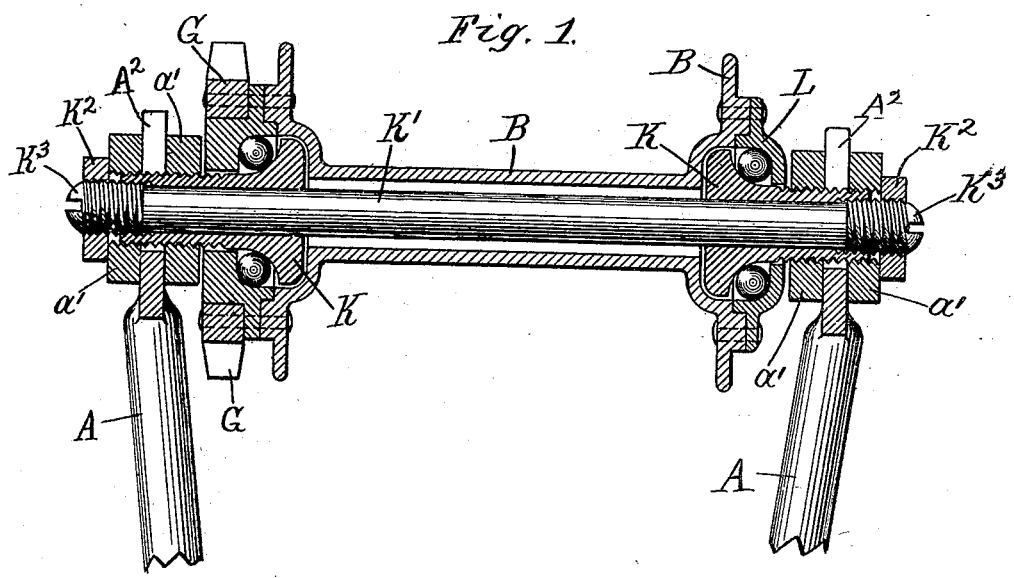
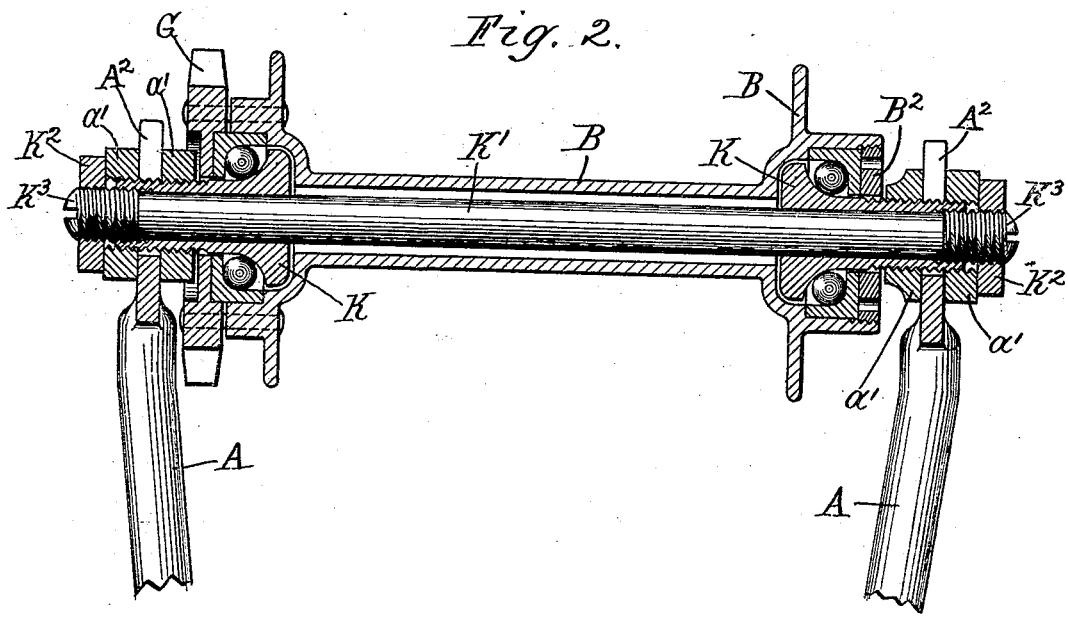
Witnesses.
E. T. Wray.
Dean Elliott.
Inventor:
Frank P. Crosby
By Burton and Burton
his attys.

UNITED STATES PATENT OFFICE.

FRANK P. CROSBY, OF CHICAGO, ILLINOIS, ASSIGNOR OF TWO-THIRDS TO FRANK J. LAMBERSON AND FRANK H. WEBSTER, OF SAME PLACE.

SHAFT-BEARING FOR VELOCIPEDES.

SPECIFICATION forming part of Letters Patent No. 511,877, dated January 2, 1894.

Application filed October 17, 1892. Serial No. 449,089. (No model.)

*To all whom it may concern:*

Be it known that I, FRANK P. CROSBY, a citizen of the United States, residing at Chicago, county of Cook, and State of Illinois, have invented certain new and useful Improvements in Shaft-Bearings for Velocipedes, which are fully set forth in the following specification, reference being had to the accompanying drawings, forming a part thereof.

This invention relates to adjustable ball bearings, such as are used at various points in the mechanism of velocipedes and other light vehicles.

In the drawings, Figure 1 is a section through the shaft of the rear or drive wheel of a bicycle of familiar pattern. Fig. 2 is a section at the same plane as Fig. 1, showing a modified form of bearing.

A represents the frame of the machine.

B is the drive-wheel hub.

G, is the pinion on the driving wheel.

A common defect in many forms of adjustable ball-bearings is that in adjusting the parts of the ball case to compensate for loss of motion, the jam-nut, or equivalent device by which the adjusted part of the case is finally made fast in adjusted position, tends in the last tightening movement to slightly set up the said adjusted part of the case in the same direction in which it has been adjusted,—that is, toward the other part,—and thereby slightly increases the tightness or closeness of the adjustment. If the adjustment has already been made as close as it ought to be, this last action of setting up the jam-nut, or other device of that nature, causes the balls to be bound between the parts of the case so that they will not roll freely therein; and in order to prevent this result, it is necessary to allow a little for this additional tightening caused by the jam-nut, and therefore not to set the said adjustable part of the case up as closely as it ultimately ought to stand. It is not possible to estimate accurately in advance how much this additional tightening caused by the jam-nut will be, and it results that frequently several attempts have to be made, tightening and loosening and re-adjusting the ball case before the desired adjustment is attained and the parts made fast.

In my invention herein described, I seek to overcome this defect by so constructing the bearing that the setting up of the jam-nut, or whatever device performs that office, instead of tending to crowd the ball-case tighter, shall tend to slacken its grasp or force it slightly back from the other part of the case and from the balls; and the proper mode of adjusting will then be, in the first instance, to set the ball-case absolutely tight against the balls, relying upon the slight slackening that will occur when the jam-nut is drawn tight to take off the pressure and leave the balls without appreciable play in the case but free to roll as they ought.

Referring to Fig. 1, K' is the axle. K K are sleeves on the axle which constitute the inner seat of the balls at the bearings. L is the cap or counter-part of the ball-case rigid with the hub B of the wheel, being secured in any desirable manner.

The sleeves K K extend out far enough to constitute the means of connection for the fork ends $A^2$ $A^2$ of the frame. These sleeves are interiorly threaded at the outer ends, and short screws $K^3$ $K^3$ are adapted to be screwed thereinto, and nuts $K^2$ $K^2$ are provided to be screwed onto the screws $K^3$ outside the jam-nuts $a'$ $a'$, by which the fork ends are bound into the sleeves K K. It will be seen upon inspection that upon loosening either jam-nut $K^2$, the screw $K^3$, being screwed in slightly, will draw the sleeve outward on the axle and bind the balls between the two parts of the case, the endwise movement of the axle relatively to the hub which is thus caused transmitting the motion to the opposite end, having the effect of drawing the other sleeve K in the same manner outward toward the outer part of the ball-case and tightening both bearings at once and equally. If, by this action, the balls are tightly bound in their cases, the setting up of the jam-nut $K^2$ to secure the screw in the sleeve, in so far as it operates to crowd the sleeve, or by frictional engagement to rotate the screw, will slacken the grasp of the case upon the balls as above described.

In order to keep the wheel centrally located in the fork, the adjustment may be made partly from each end, or alternately between the two ends.

In the form of drive wheel bearing shown in Fig. 4, the adjustment is precisely the same as in the form shown in Fig. 1, the difference in the two constructions being only in respect to the means of securing the outer portion of the ball case in its position in the hub. In the form illustrated in Fig. 1, the cap is adapted to be made fast by rivets or screws to the hub at the end which does not have the sprocket pinion, and at the opposite end the cap is provided with a seat for the pinion, and the pinion and cap are adapted to be secured to the hub. In the form shown in Fig. 4, the cap at the end not having the sprocket pinion is held in the hub by means of a disk B², which is screwed into the hub by means of a spanner wrench, the hub being elongated, and the cavity for the cap being interiorly threaded to receive the threaded disk B². At the opposite end at which the sprocket pinion is located, the cap is seated in the cavity in the hub in the same manner as above described, but protrudes partly from it, and the pinion is itself recessed on the face to receive the protruded portion of the cap leaving a portion of the web of the pinion which extends inward to the sleeve K and serves to bind the cap in place in the hub, when the pinion is in any suitable manner made fast to the latter. In both of these forms, the sprocket pinion is reversible. This feature I do not claim in this application, as it is fully covered and more fully described in my application, Serial No. 449,090, filed October 17, 1892.

I claim—

1. In a velocipede, in combination with the sleeves constituting the inner members of the ball-cases, the outer members of the ball-cases respectively being rigid with the wheel hub; a rod extending within said sleeves; and screws which constitute plugs for the ends of the sleeves abutting endwise against the ends respectively of said rod, and jam-nuts on the protruding ends of said screws: substantially as set forth.

2. In a velocipede, in combination with the wheel, similar sleeves which constitute the inner members respectively of the ball-cases, the outer members of said cases being rigid with the hubs of the wheel, said sleeves protruding from the hubs and the fork ends secured to said protruding ends of the sleeves respectively; a rod on which said sleeves are mounted, the same extending axially within the sleeves; screws constituting the plugs in the ends of the sleeves abutting endwise against the end of said rod and protruding from the sleeves; and jam-nuts on such protruding ends of the screws: substantially as set forth.

3. In a velocipede, in combination with the wheel, sleeves constituting the inner members respectively of the ball cases, the outer members of said cases being rigid with the hubs respectively of the wheel, said sleeves protruding through the said outer members and exteriorly threaded at their protruding portions; the fork ends bound onto said protruding ends respectively between the jam-nuts thereon, whereby they are rigidly held independently of the adjustment of the ball cases; a rod extending axially within the sleeves to keep them in alignment; the screws constituting plugs in the ends of the sleeves abutting against the end of said rod; and jam-nuts on the protruding ends of said screws: substantially as set forth.

In testimony whereof I have hereunto set my hand, in the presence of two witnesses, at Chicago, Illinois, this 11th day of October, 1892.

FRANK P. CROSBY.

Witnesses:
CHAS. S. BURTON,
JEAN ELLIOTT.